United States Patent
Hsu

(10) Patent No.: US 6,464,869 B1
(45) Date of Patent: Oct. 15, 2002

(54) FILTER ASSEMBLY FOR A FAUCET

(75) Inventor: Robin Hsu, Taichung Export Processing Zone (TW)

(73) Assignee: Globe Union Industrial Corp., Taichung Export Processing Zone (TW)

( * ) Notice: Subject to any disclaimer, the term of this patent is extended or adjusted under 35 U.S.C. 154(b) by 0 days.

(21) Appl. No.: 09/899,053

(22) Filed: Jul. 6, 2001

(51) Int. Cl.[7] .......................... B01D 27/00; B01D 27/02; B01D 35/02; B01D 35/157
(52) U.S. Cl. ....................... 210/232; 210/136; 210/238; 210/418; 210/443
(58) Field of Search ................................ 210/136, 232, 210/238, 443, 418

(56) References Cited

U.S. PATENT DOCUMENTS 5,753,118 A * 5/1998 Yang
5,983,938 A * 11/1999 Bowers et al.
6,135,151 A * 10/2000 Bowers et al.
6,183,636 B1 * 2/2001 Bowers et al.

* cited by examiner

Primary Examiner—Thomas M. Lithgow
(74) Attorney, Agent, or Firm—Liniak, Berenato, Longacre & White

(57) ABSTRACT

A filter assembly for a faucet includes a filtering element accommodated within a filter body. A sleeve is disposed within a neck portion of the filter body. A lock ring is sleeved threadably on the filter body, and pushes a ball to project partially from an inner surface of the neck portion so that the ball presses downwardly against a stop shoulder of the sleeve, thereby preventing upward removal of the sleeve from the neck portion. In assembly, when the sleeve is mounted into the neck portion, a curved pushing surface of the sleeve pushes the ball to project partially from an outer surface of the neck portion. Subsequently, when the lock ring is mounted on the filter body, it pushes the ball to project partially from the inner surface of the neck portion.

6 Claims, 9 Drawing Sheets

FILTER ASSEMBLY FOR A FAUCET

BACKGROUND OF THE INVENTION

1. Field of the Invention

This invention relates to a filter assembly, more particularly to a filter assembly for a faucet, which includes a filtering element that can be easily mounted and dismounted.

2. Description of the Related Art

Referring to FIGS. 1 and 2, a conventional filter assembly 10 for a faucet is shown to include a filter body 11, an upper valve seat 12, a lower valve seat 13, a stop valve 14, a filtering element 15, an adjusting valve 16, and a cover 17. Before the filtering element 15 is mounted into the filter body 11, the stop valve 14 is biased upward by a spring 141 to prevent water flow from a water inlet 131 to a valve hole 130 in the lower valve seat 13. When the filtering element 15 is mounted into the filter body 11, it pushes the stop valve 14 downwardly within the lower valve seat 13 against the biasing action of the spring 141, thereby permitting water flow from the inlet 131 into the filtering element 15 through the valve hole 130 in the lower valve seat 13. The adjusting valve 16 can be rotated between an open position, where water flows from an interior passage of the filtering element 15 to an annular passage 151 defined between the filtering element 15 and a surrounding wall of the filter body 11 and subsequently to a water outlet 132 in the lower valve seat 13, and a closed position, where water flow between the interior passage in the filtering element 15 and the annular passage 151 is stopped. The aforesaid conventional filter assembly 10 has the following drawbacks:

When one intends to replace the filtering element 15, it is necessary to dismount the upper valve seat 12 from the filter body 11. Also, in order to dismount the upper valve seat 12, it is necessary to remove the cover 17 and two threaded members 18, 19 in advance. It is both labor and time-consuming to remove the threaded members 18, 19 in view of the condition that two spanners of different sizes are required to drive hexagonal upper ends of the threaded members 18, 19. Furthermore, when the adjusting valve 16 is closed, because the filtering element 15 remains in the filter body 11, water still flows from the interior passage in the filtering element 15 to the annular passage 151, thereby resulting in difficulty in rotating the threaded members 18, 19.

SUMMARY OF THE INVENTION

An object of this invention is to provide a filter assembly for a faucet, which includes a filtering element that can be easily mounted and dismounted.

According to this invention, a filter assembly for a faucet includes a filtering element accommodated within a filter body. A sleeve is disposed within a neck portion of the filter body. A lock ring is sleeved threadably on the filter body, and pushes a ball to project partially from an inner surface of the neck portion so that the ball presses downwardly against a stop shoulder of the sleeve, thereby preventing upward removal of the sleeve from the neck portion. In assembly, when the sleeve is mounted into the neck portion, a curved pushing surface of the sleeve pushes the ball to project partially from an outer surface of the neck portion. Subsequently, when the lock ring is mounted on the filter body, it pushes the ball to project partially from the inner surface of the neck portion.

Preferably, a rotary knob is connected fixedly to a stop valve so as to rotate the latter in the filter body between an open position for permitting water flow from a water inlet to a water outlet via the filtering element, and a closed position for stopping completely water flow in the filter assembly. When the stop valve is disposed at the closed position, the filtering element can be easily replaced.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
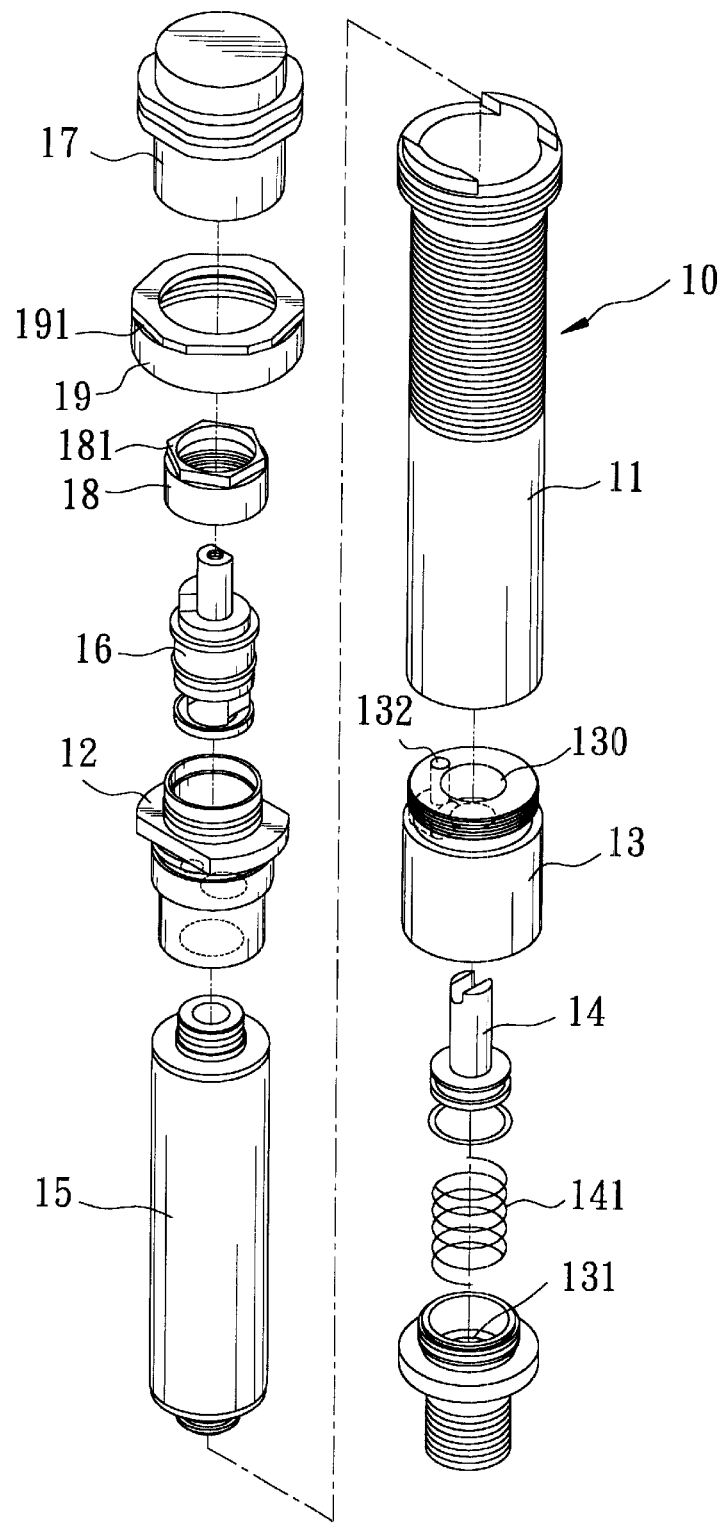
FIG. 1 is an exploded perspective view of a conventional filter assembly for a faucet.
Figure 2:
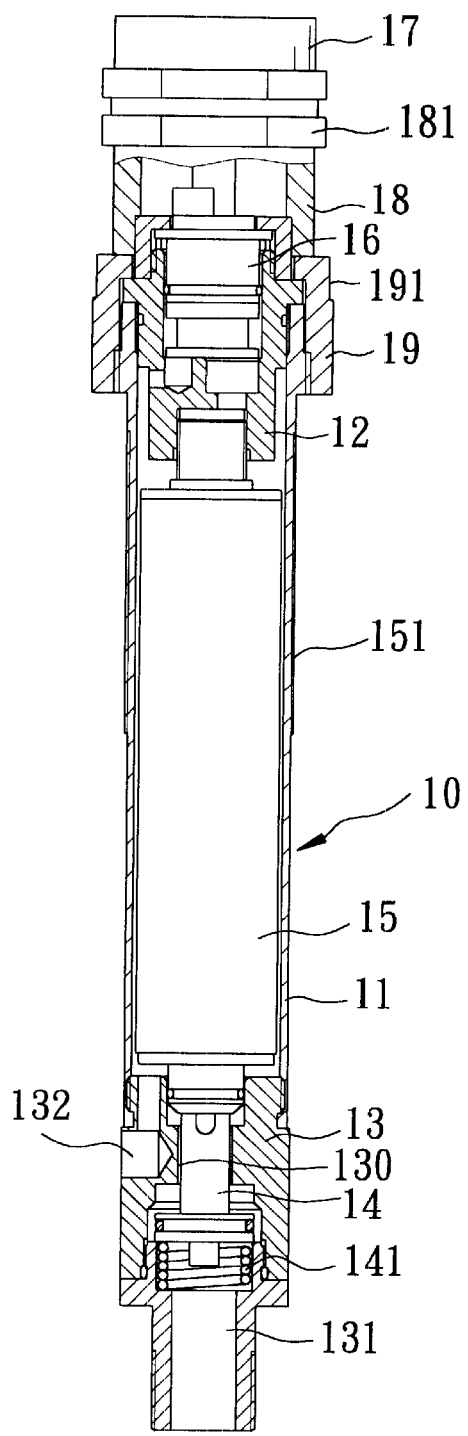
FIG. 2 is a partly sectional view of the conventional filter assembly.
Figure 3:
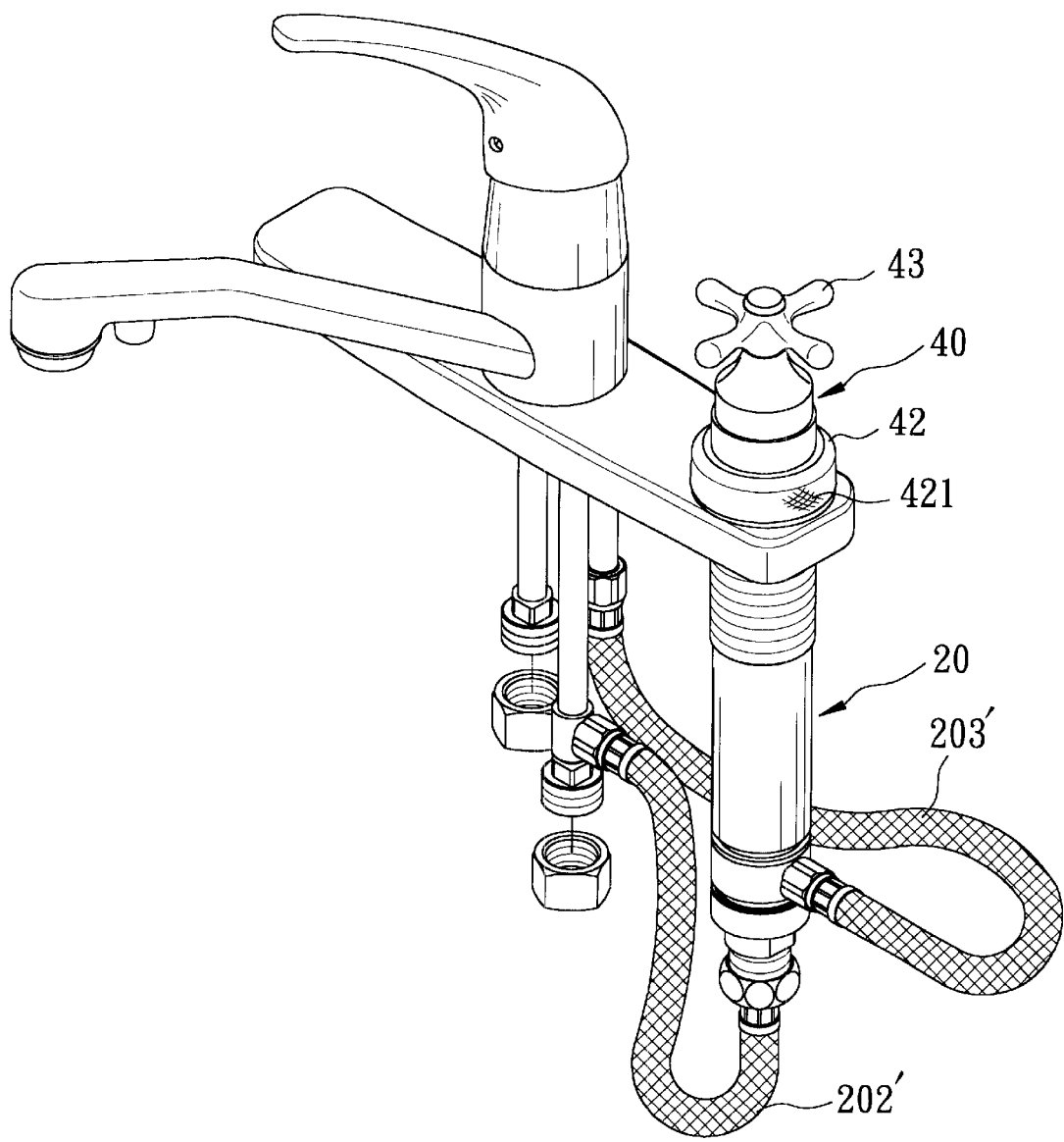
FIG. 3 is a perspective view showing a faucet apparatus that incorporates the preferred embodiment of a filter assembly according to this invention.
Figure 4:
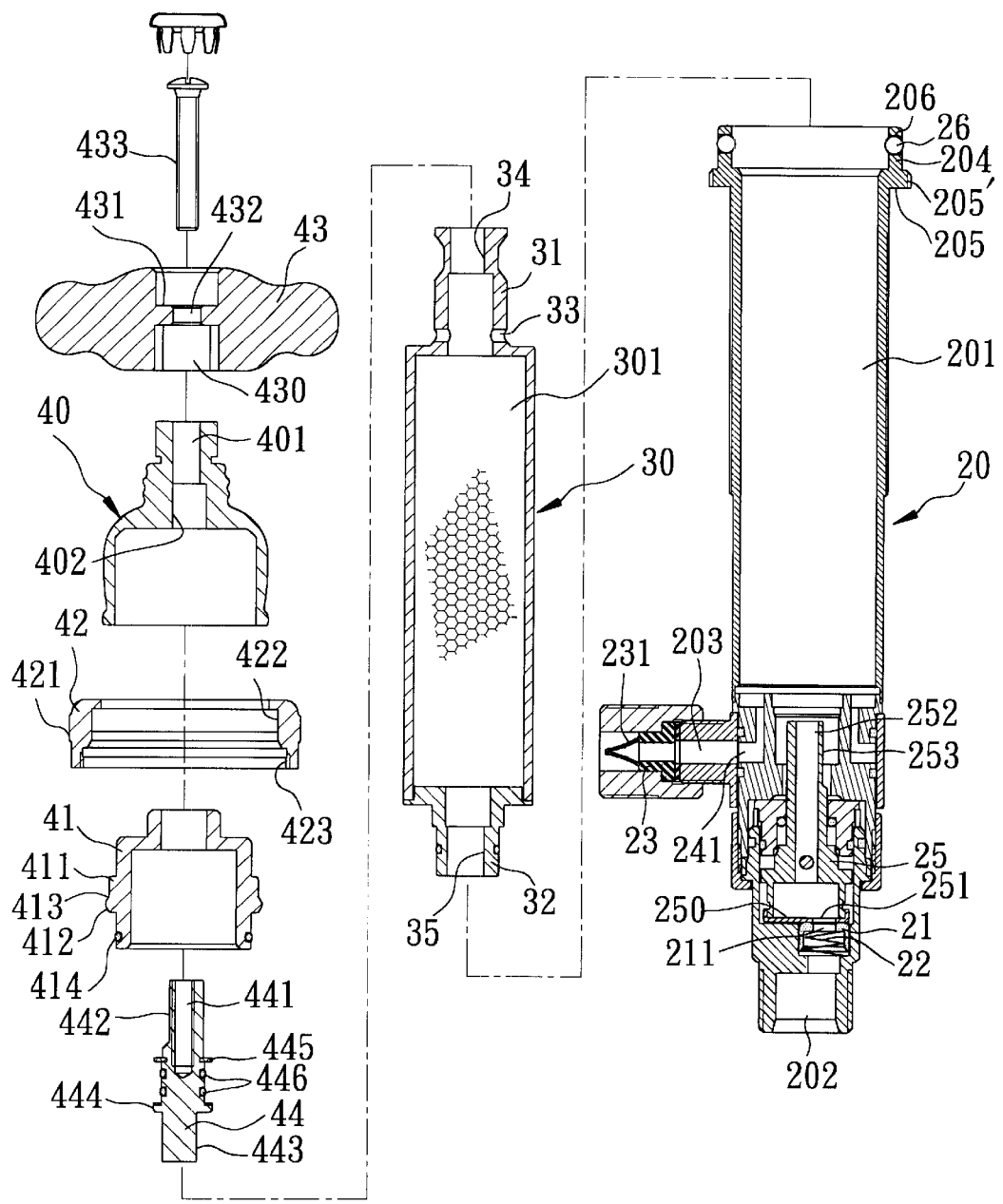
FIG. 4 is a partly exploded sectional view of the preferred embodiment.
Figure 5:
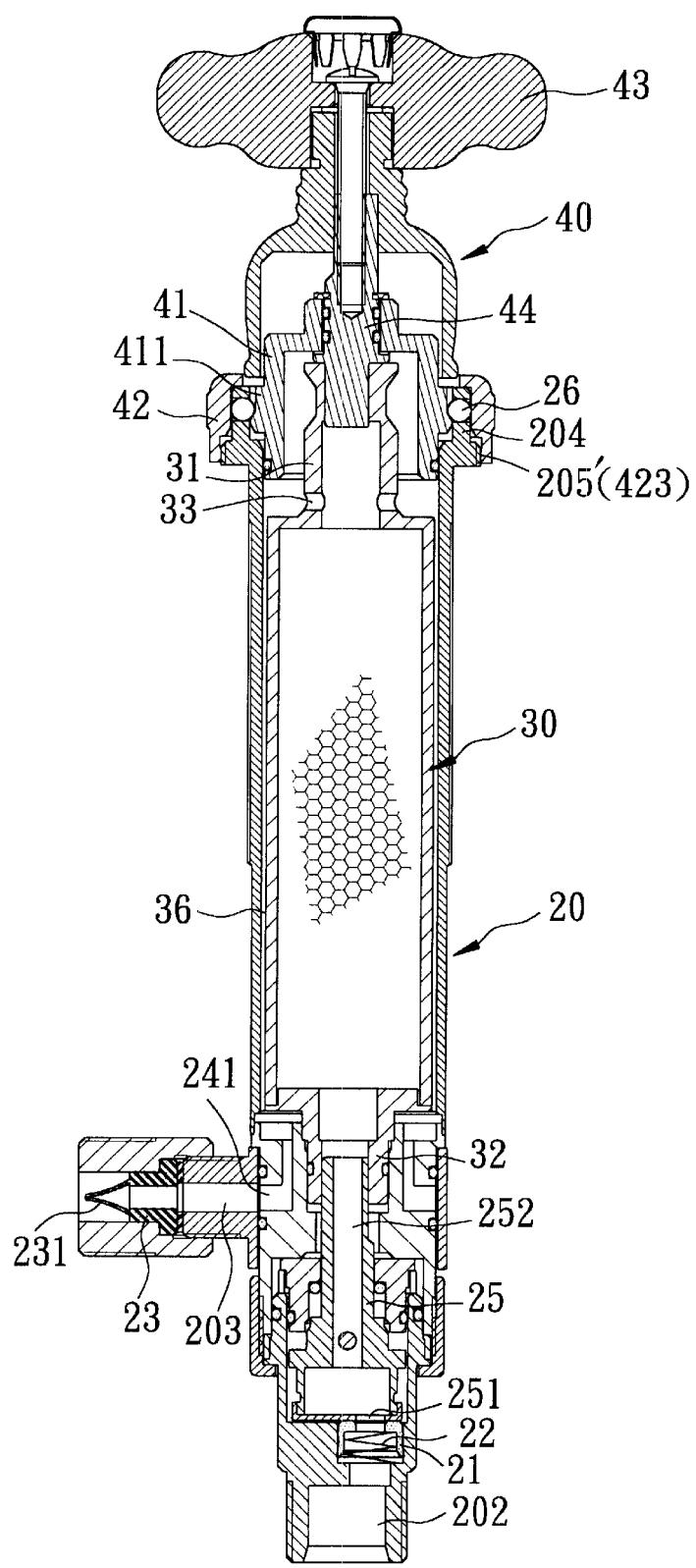
FIG. 5 is an assembled sectional view of the preferred embodiment.

Referring to FIG. 3, the preferred embodiment of a filter assembly of the present invention is adapted to be applied to a faucet, and is coupled with an inflow pipe 202' and an outflow pipe 203'. Referring to FIGS. 3, 4 and 5, the filter assembly is shown to include a filter body 20, a filtering element 30, and a tubular cap 40. The filter body 20 has an accommodating chamber 201 defined therein for receiving the filtering element 30, a water inlet 202 formed at a lower end thereof, a water outlet 203 formed between the chamber 201 and the water inlet 202, and an annular lock neck portion 204. An outward flange 205 extends radially and outwardly from the filter body 20 so as to define the neck portion 204 thereabove, and has an outer periphery that is formed with an external thread portion 205'.

A hollow cylinder 21 is disposed fittingly and movably within an upper end of the water inlet 202, and is biased by a spring element 22 to press against a bottom wall 250 of a hollow stop valve 25 in such a manner to permit rotation of the stop valve 25 relative to the hollow cylinder 21. The stop valve 25 can rotate relative to the hollow cylinder 21 so as to align an opening 251 in the bottom wall 250 with a central bore 211 in the hollow cylinder 21, thereby permitting water flow from the water inlet 202 to an interior passage 201 in the filtering element 30 via the central bore 211 in the hollow cylinder 21 and an interior passage 252 in the stop valve 25 that is in fluid communication with the opening 251 in the stop valve 25.

Figure 6:
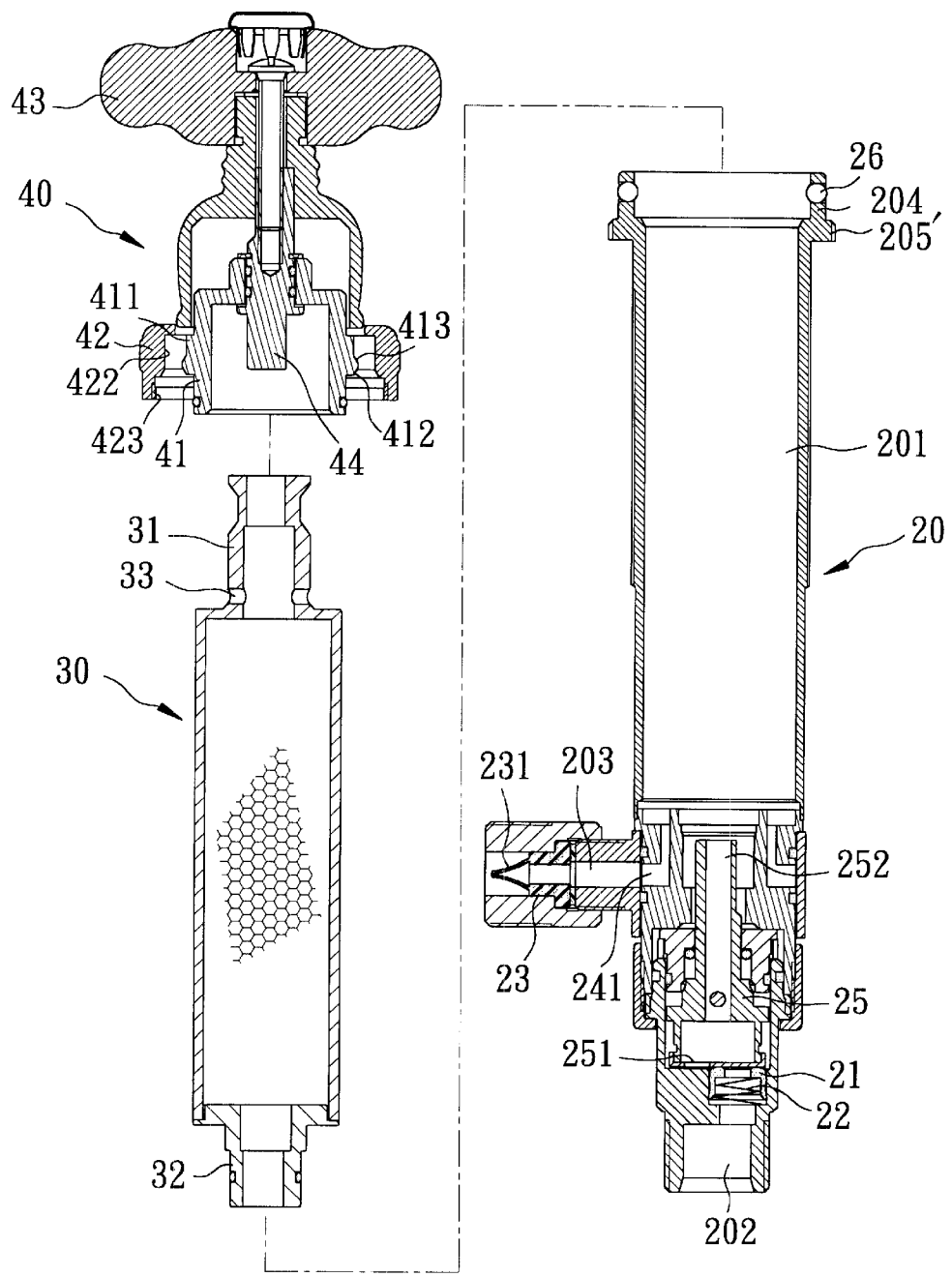
FIG. 6 is a partly exploded sectional view of the preferred embodiment, illustrating how a stop valve is closed.
Figure 6A:
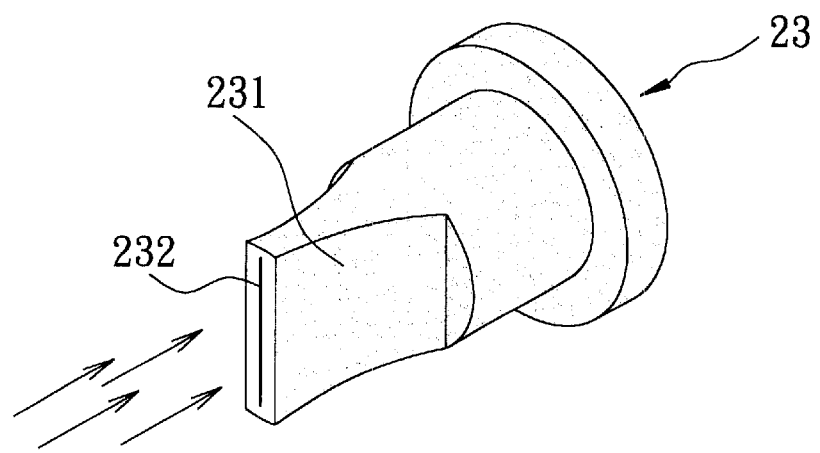
FIG. 6A is a perspective view of a rubber nipple of the preferred embodiment when it is at a closed state.
Figure 6B:
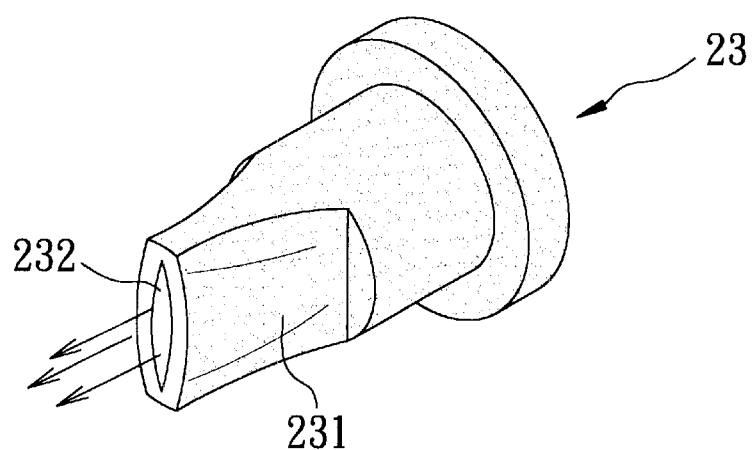
FIG. 6B is a perspective view of the rubber nipple of the preferred embodiment when it is at an open state.

A one-way valve 23 is associated with the water outlet 203, and is constructed as a rubber nipple, which has a nose 231 (see FIG. 6A) that is formed with a normally-closed slit 232 (see FIG. 6A). When water flows from the water outlet 203 into the one-way valve 23, the nose 231 expands so as to permit water flow through the one-way valve 23, as shown in FIG. 6B.

The neck portion 204 has a wall, which is formed with four equidistant radial holes 206 therethrough, within which fourballs 26 are disposed respectively and movably.

A sleeve 41 has a lower end, which is inserted into an upper end of the filter body 20. A lock ring 42 is sleeved rotatably on the neck portion 204, and has a knurled outer surface 421 for facilitating rotation of the lock ring 42, a flat inner surface 422 that pushes the balls 26 inwardly so that the balls 26 project partially from an inner surface of the neck portion 204, and an internal thread portion 423 that engages the external thread portion 205 of the filter body 20. The sleeve 41 has an outward flange 411, which includes a curved pushing surface 412 that reduces downwardly and gradually in diameter, and a stop shoulder 413 that is formed above the pushing surface 412. The balls 26 press downwardly against the stop shoulder 413 so as to prevent upward removal of the sleeve 41 from the neck portion 204. An O-ring 414 is sleeved fixedly on a lower end portion of the sleeve 41 so as to establish a liquid-tight seal between the sleeve 41 and the filter body 20.

The cap 40 is located over the sleeve 41. A tubular rotary knob 43 has a bottom surface that is formed with a hexagonal hole 430 for engaging fittingly an upper end of the cap 40, and an inward flange 431 that extends radially and inwardly therefrom and that defines a hole 432. Accordingly, the cap 40 can rotate synchronously with the rotary knob 43. A lock bolt 433 extends through the hole 432 in the rotary knob 43 and a central hole 401 in the cap 40 to engage a threaded hole 441 in an upper end surface of a vertical connecting rod 44 which has an upper end portion that is inserted into the hole 401 in the cap 40. Because the upper end portion of the connecting rod 44 is formed with a flat surface 442 that engages a flat inner surface 402 of the cap 40, the connecting rod 44 can rotate synchronously with the cap 40. Likewise, the connecting rod 44 has a lower end portion, which is formed with a flat surface 443 that engages a flat inner surface 34 of a tubular upper end of the filtering element 30, thereby permitting synchronous rotation of the filtering element 30 with the connecting rod 44. Also, a tubular lower end 32 of the filtering element 30 is sleeved non-rotatably on an upper end portion of the stop valve 25, which has a flat surface 253 that engages a flat inner surface 35 of the filtering element 30 such that the stop valve 25 can rotate synchronously with the filtering element 30. As such, the stop valve 25 can rotate with the rotary knob 43 between an open position shown in FIG. 5, where the opening 251 is aligned with and is in fluid communication with the bore 211 in the hollow cylinder 21, and a closed position shown in FIG. 6, where the opening 251 is deflected from the bore 211 so as to stop water flow from the water inlet 202 to an interior passage 301 in the filtering element 30.

The connecting rod 44 further has an outward flange 444 for supporting the sleeve 41, and a C-shaped retaining ring 445 disposed immediately over an upper end of the sleeve 41 so as to confine a portion of the sleeve 41 between the outward flange 444 and the C-shaped retaining ring 445, thereby positioning the sleeve 41 relative to the filter body 20. Two C-rings 446 are sleeved fixedly on the connecting rod 44 so as to establish a liquid-tight seal between the cap 40 and the connecting rod 44.

An annular passage 36 is formed in the filter body 20 and around the filtering element 30. When the stop valve 25 is disposed at the open position, water flows from the interior passage 301 to the annular passage 36 via a plurality of holes 33 in an upper end portion of the filtering element 30, and subsequently to the water outlet 203 via a passage 241.

Figure 7:
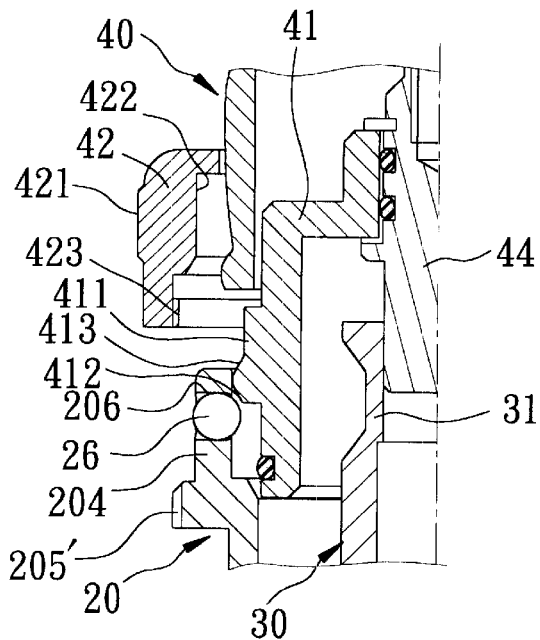
FIGS. 7 and 8 are fragmentary sectional views of the preferred embodiment, illustrating how a ball is moved by a sleeve.
Figure 8:
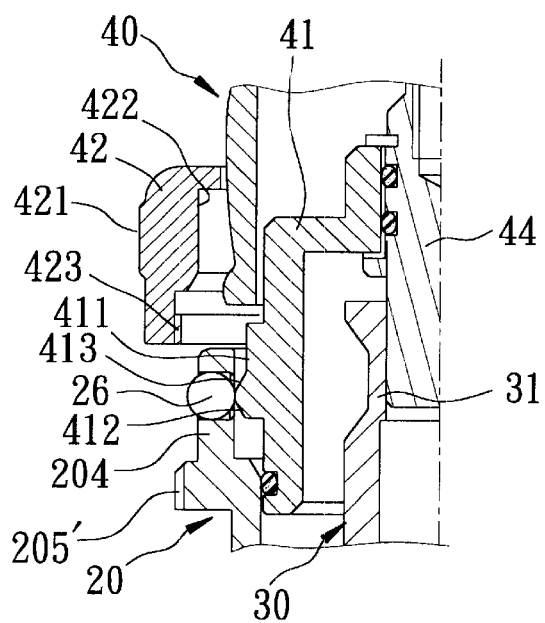
Figure 9:
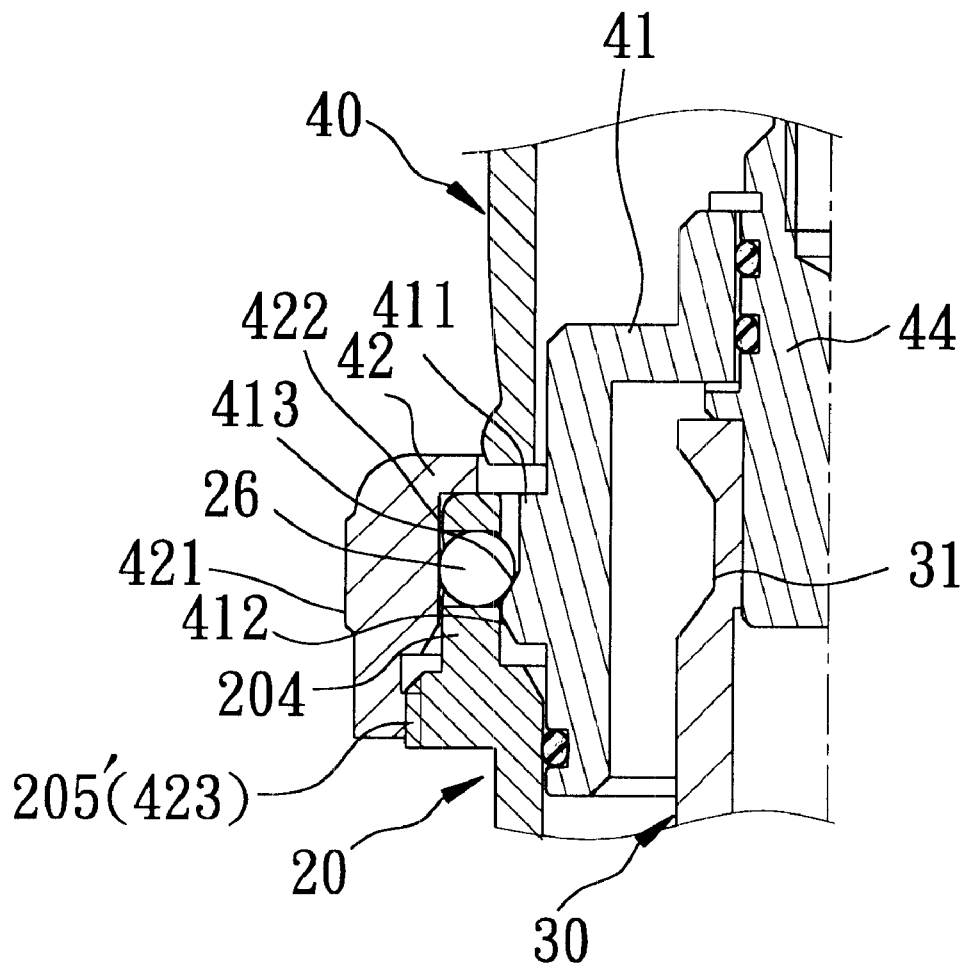
FIG. 9 is fragmentary sectional view of the preferred embodiment, illustrating how the sleeve is prevented from upward removal from a filter body.

Referring to FIG. 7, in case the filtering element 30 is disposed in the filter body 20, when the sleeve 41 is inserted into the neck portion 204, the pushing surface 412 will contact the balls 26. Subsequently, the balls 26 are pushed outwardly by the pushing surface 412 to project partially from an outer surface of the neck portion 204, as shown in FIG. 8. Finally, the lock ring 42 is sleeved on the neck portion 204, with the internal thread portion 423 engaging the external thread portion 205', such that the balls 26 are pushed inwardly to project from the inner surface of the neck portion 204, thereby locking the sleeve 41 on the neck portion 204, as shown in FIG. 9.

Accordingly, the filtering element 30 can be easily mounted on and dismounted from the filter body 20. Furthermore, water flow in the filter assembly of this invention can be stopped completely by rotating the rotary knob 43, thereby facilitating replacement of the filtering element 30.

With this invention thus explained, it is apparent that numerous modifications and variations can be made without departing the scope and spirit of this invention. It is therefore intended that this invention be limited only as indicated by the appended claims.

I claim:
1. A filter assembly comprising:
   a filter body having
      an accommodating chamber defined therein,
      a water inlet formed at a lower end of said filter body,
      a water outlet formed between said chamber and said water inlet,
      a stop valve disposed rotatably in said filter body for controlling opening and closing of said water inlet,
      an annular neck portion formed above said chamber and having an inner surface, an outer surface, and a wall with a radial hole formed therethrough,
      an outward flange extending radially and outwardly from said filter body so as to define said neck portion thereabove, said outward flange of said filter body having an outer periphery that is formed with an external thread portion, and
      a ball confined within said radial hole in said neck portion and movable within said radial hole to project partially from either of said inner and outer surfaces of said neck portion;
   a filtering element disposed removably within said chamber in said filter body and in fluid communication with both said water inlet and said water outlet in said filter body so as to permit water flow from said water inlet to said water outlet via said filtering element;
   a sleeve disposed removably within said neck portion of said filter body in such a manner that a liquid-tight seal is established between said sleeve and said filter body, and having a curved pushing surface that reduces downwardly and gradually in diameter, and a stop shoulder that is formed above said pushing surface;
   means for supporting and positioning said sleeve relative to said filter body; and
   a lock ring having an internal thread portion that engages said external thread portion of said neck portion, and an inner surface that pushes said ball to project partially from said inner surface of said neck portion such that said ball presses downwardly against said stop shoulder of said sleeve, thereby preventing upward removal of said sleeve from said neck portion of said filter body so as to fix said filtering element within said chamber in said filter body;

whereby, when said sleeve is mounted in said neck portion of said filter body, said curved pushing surface of said sleeve pushes said ball outwardly to project partially from said outer surface of said neck portion so that, when said lock ring is mounted on said outward flange of said neck portion, said ball is pushed inwardly by said lock ring to a position above said stop shoulder of said sleeve, thereby locking said sleeve on said neck portion.

2. The filter assembly as claimed in claim 1, further comprising a rotary knob that is disposed rotatably above said sleeve and that is connected fixedly to an upper end of said filtering element, said filtering element having a lower end that is connected fixedly to said stop valve so that said stop valve can be closed and opened by rotating said rotary knob.

3. The filter assembly as claimed in claim 2, further comprising a vertical connecting rod, which has an upper end that is connected fixedly to said rotary knob, and a lower end that is connected fixedly to said filtering element, said means for supporting and positioning said sleeve including an outward flange that extends radially and outwardly from said connecting rod, and a C-retaining ring that is sleeved fixedly on said connecting rod and that is located immediately over said sleeve so as to confine a portion of said sleeve between said outward flange of said connecting rod and said C-shaped retaining ring in such a manner that a liquid-tight seal is established between said connecting rod and said sleeve.

4. The filter assembly as claimed in claim 1, wherein said filter body further includes a one-way valve, which is associated with said water outlet so as to permit outflow of water from said water outlet therethrough and so as to prevent return flow of water to said water outlet therethrough.

5. The filter assembly as claimed in claim 4, wherein said one-way valve is constructed as a rubber nipple, which has a nose that is formed with a slit and that is forced to expand so as to permit water flow therethrough when water flows from said filtering element to said water outlet.

6. The filter assembly as claimed in claim 1, wherein said stop valve has an interior passage that is in fluid communication with said filtering element, and a fixed bottom wall with an opening that is in fluid communication with said interior passage, said water inlet having an upper end, said filter body further including a hollow cylinder that is received fittingly within said upper end of said water inlet and that defines a central bore therein, and a spring element for biasing said hollow cylinder to press against said bottom wall of said stop valve in such a manner to permit rotation of said stop valve relative to said hollow cylinder, said stop valve being rotatable relative to said hollow cylinder so as to align said opening in said bottom wall with said central bore in said hollow cylinder, thereby permitting water flow from said water inlet to said filtering element via said central bore in said hollow cylinder and said opening and said interior passage in said stop valve.

\* \* \* \* \*